United States Patent [19]

Drag

[11] Patent Number: 5,131,161

[45] Date of Patent: Jul. 21, 1992

[54] GUIDE POST AND MASTER CYLINDER SQUARENESS GAGE

[75] Inventor: Gerard Drag, Morton Grove, Ill.

[73] Assignee: Connell Limited Partnership, Boston, Mass.

[21] Appl. No.: 657,498

[22] Filed: Feb. 19, 1991

[51] Int. Cl.⁵ .............................................. G01B 3/50
[52] U.S. Cl. ........................................ 33/533; 33/535; 33/DIG. 1
[58] Field of Search ............... 33/DIG. 1, 535, 533, 33/534, 550, 553, 645, 475

[56] References Cited

U.S. PATENT DOCUMENTS

| | | | |
|---|---|---|---|
| 2,815,582 | 12/1957 | Karstens | 33/533 X |
| 3,525,158 | 8/1970 | Torlay | 33/661 |
| 3,688,412 | 9/1972 | Keener | 33/533 |
| 4,096,634 | 6/1978 | Gudel | 33/533 X |

FOREIGN PATENT DOCUMENTS 0201101 8/1989 Japan ........................... 33/535

Primary Examiner—Harry N. Haroian
Attorney, Agent, or Firm—Leydig, Voit & Mayer

[57] ABSTRACT

A guide post and/or master cylinder squareness gage has a vee-block for attaching the gage to a guide post or master cylinder. The vee-block includes a gage stop which bears against the plane surface when the gage is attached to the guide post or master cylinder. The vee-block also includes a measurement indicator mounted to the vee-block which indicator has a biased contact which also bears against the plane surface at a position spaced from the stop. The indicator indicates the deviation in the perpendicularly of the guide post as the gage is rotated around the guide post. The flatness of the plane surface can be measured by rotating the gage attached to the master cylinder on the plane surface. The perpendicularity of the master cylinder can be measured by rotating the master cylinder with the gage held in one position.

24 Claims, 5 Drawing Sheets 5,131,161

GUIDE POST AND MASTER CYLINDER SQUARENESS GAGE

FIELD OF THE INVENTION

The present invention relates generally to measuring the perpendicularity of a cylindrical column in relationship to a plane surface, and more particularly to a gage for measuring the perpendicularity of guide posts or master cylinders.

BACKGROUND OF THE INVENTION

The precise perpendicularity of cylindrical columns to the planar surfaces in which they are mounted is of great importance in various operations, such as conventional die sets. To insure precise spacing and parallelism, guide posts in conventional die sets are press fitted into deep bores formed in the die shoe or base plate. Securing a deep interfering fit requires exerting high pressure during installation and removal, pressures which may be on the order of 3-15 tons so that a hydraulic press usually is employed. The cylindrical columns, here guide posts, are required to withstand high, unbalanced, i.e., cantilevered, load forces without acquiring an angular set. Where the posts acquire an angular set with respect to the die shoe, the die set surfaces are no longer perfectly parallel and difficulty may be experienced in removing and installing the upper die set member.

Further, the guide posts must have an initial precise perpendicularity to the plane surface, such as the die holder plate surface. Measurement of the required perpendicularity in the prior art typically has not been particularly precise. The measurements have been made by comparing the guide posts and surface to a mechanically formed ninety degree angle or square. Such measurements are imprecise at best.

The planar surface also must be measured, such as by utilizing a master cylinder. Again the measurements of the master cylinder have not always been as precise as desired and hence the planar surface measurement also may be incorrect. This again will effect the precision of the die sets.

It would be desireable to provide a guide post and master cylinder squareness gage, which is easily operable and which provides a precise perpendicularity measurement between the guide posts and the planar surfaces in which they are mounted and between the master cylinders and the planar surfaces.

OBJECTS AND SUMMARY OF THE INVENTION

It is, therefore, a primary object of the present invention to provide a guide post squareness gage which can be attached to a guide post to easily measure the perpendicularity of the guide post to the planar surface.

A further object of the present invention is to provide a guide post squareness gage which automatically provides a perpendicularity measurement as the guide post squareness gage is rotated around a guide post.

A still further object of the present invention is to provide a guide post and master cylinder squareness gage which can be utilized to measure both the perpendicularity of the master cylinder and the flatness of the planar surface.

Another object of the present invention is to provide a guide post and master cylinder squareness gage magnetically attachable to the guide post or master cylinder.

In general, the present invention contemplates a guide post and master cylinder squareness gage having a magnetic vee-block for attachment to a guide post and/or master cylinder. The vee-block includes a gage stop which bears against the plane surface. The vee-block also carries a measurement indicator which has a movable contact which also bears on the planar surface, spaced from the gage stop. The measurement indicator contact is biased to follow the planar surface as the guide post squareness gage is rotated around the guide post. The measurement indicator directly indicates the deviation from perpendicularity of the guide post. In a like manner the guide post and master cylinder squareness gage is biased to follow the planar surface as the master cylinder and squareness gage are rotated on the planar surface. By holding the squareness gage and rotating the master cylinder, both a zero point for the squareness gage can be set as well as measuring the perpendicularity of the master cylinder.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DESCRIPTION OF THE PREFERRED EMBODIMENTS

Figure 1:
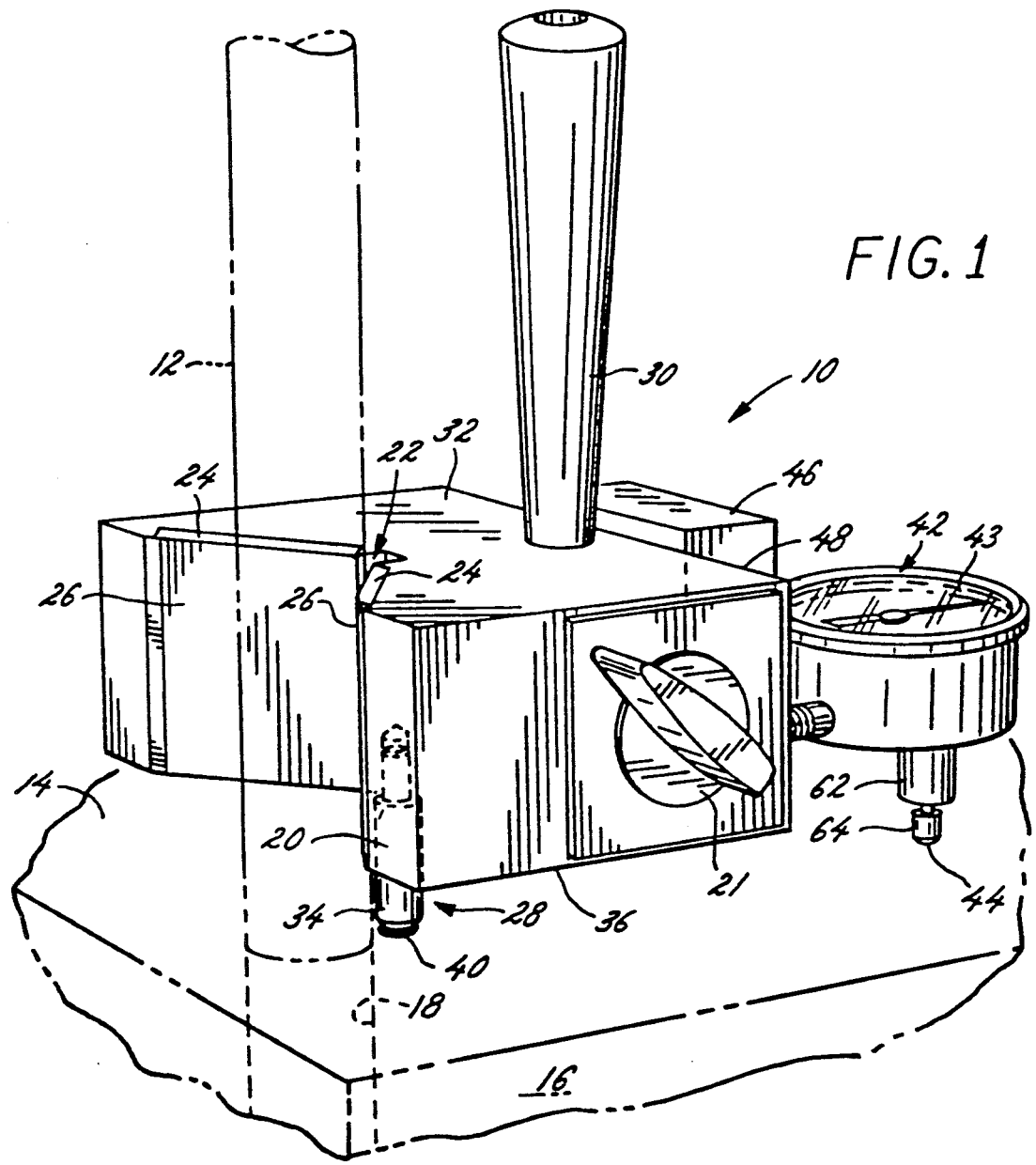
FIG. 1 is a perspective view of one embodiment of the guide post and/or master cylinder squareness gage of the present invention.
Figure 2:
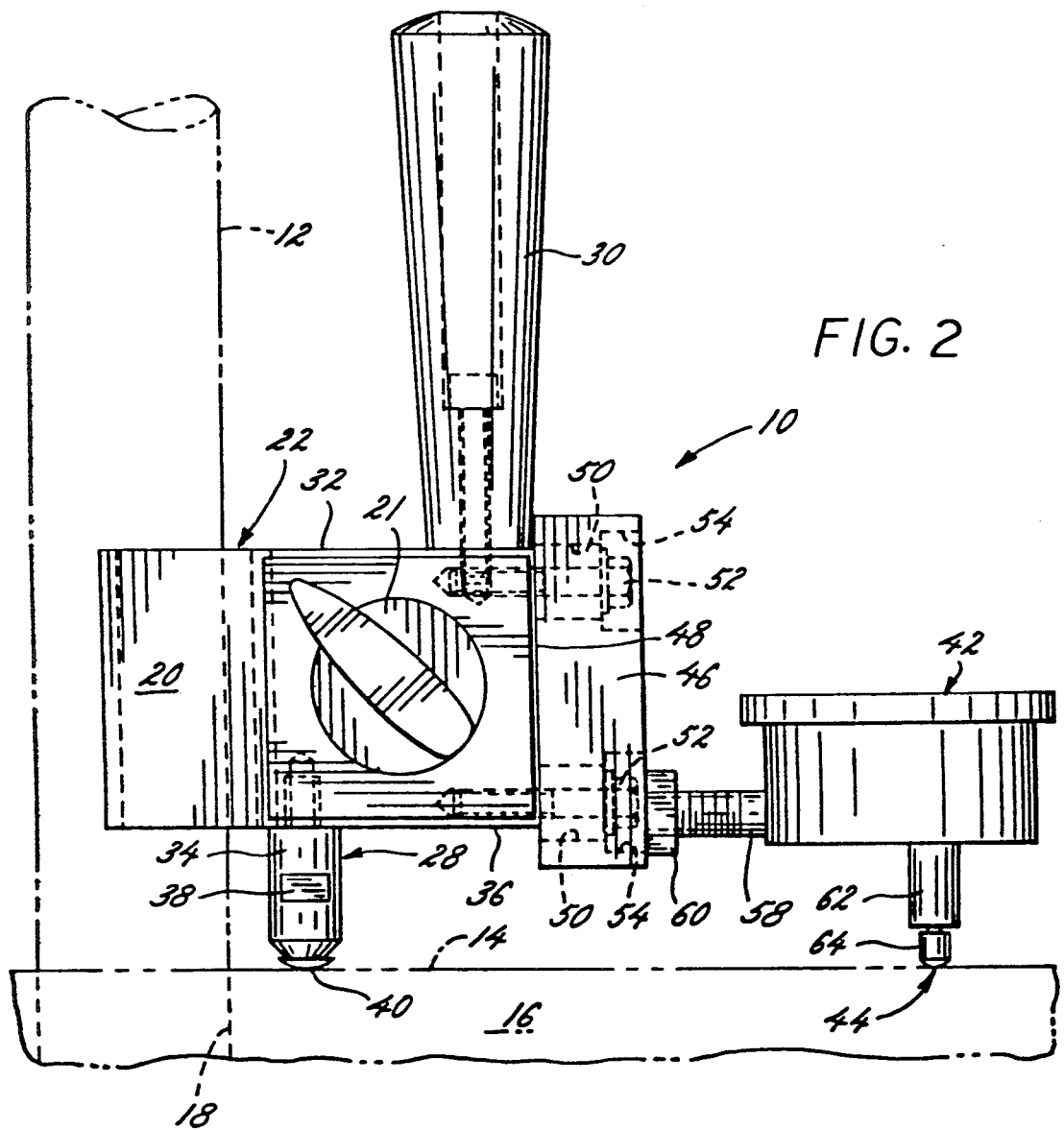
FIG. 2 is a side plan view of the guide post squareness gage of FIG. 1.
Figure 3:
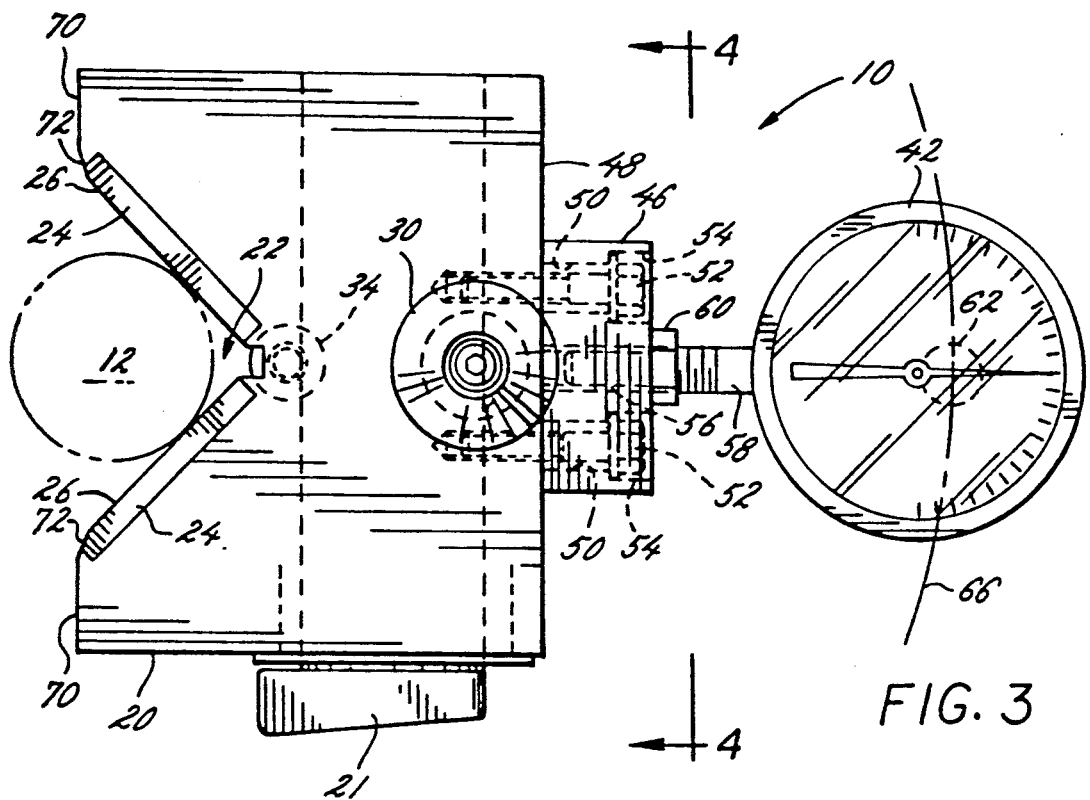
FIG. 3 is a top plan view of the guide post squareness gage of FIG. 1.

Turning to the drawings, there is shown in FIGS. 1 to 3 a guide post and/or master cylinder squareness gage of the present invention generally indicated by the reference numeral 10. The gage 10 is utilized to measure the perpendicularity of a column 12, such as a guide post, in relationship to a plane surface 14, such as the top surface of a die holder base plate 16 The guide post 12 is inserted into a bore 18 in the plate 16 and the perpendicularity of the guide post 12 to the plane surface 14 is critical to the proper use of the die set.

The gage 10 includes a guide post attachment element or device 20. The device 20 can be a mechanical type device, but preferably will be a magnetic element 20, such as a commercially available, magnetic vee-block.

The device 20, whether mechanical or magnetic, attaches the gage 10 to the guide post 12 with a parallel attachment surface. The device 20 will allow the gage 10 to be rotated around the guide post 12 to measure the perpendicularity as described hereinafter. The vee-block 20 can be a KMV80 Kanetsu magnetic V-block having a polarized/depolarized lever or switch 21. Moving the switch 21 to the on or polarized portion in the vee-block 20, magnetically attaches the gage 10 to the post 12. Moving the switch 21 to the de-polarized position releases the gage 10.

The vee-block 20 has a vee 22 formed therein. The vee 22 is modified by mounting a pair of carbide wear strips 24 to the vee 22. The strips 24 each have a planar surface 26, which form the parallel attachment surfaces for the vee-block 20 and maintains the gage 10 against the surface of the guide post 12, while allowing the gage 10 to be rotated around the guide post 12.

The vee-block 20 also is modified to include a stop 28 for the gage 10. The stop 28 bears against the plane surface 14 at a position adjacent but spaced from the guide post 12 to form with the surfaces 26 a precisely aligned measuring position for the gage 10. The gage 10 also includes a handle 30 mounted in a top wall 32 of the vee-block 20. The handle 30 is utilized to position the gage 10 for attachment to the guide post 12 and to ensure contacting of the stop 28 with the plane surface 14.

To provide precision and wearability for the stop 28, the stop 28 includes a post 34 which is threaded into a bottom wall 36 of the vee-block 20. The post 34 includes a pair of wrench flats 38 (only one of which is illustrated) to thread the stop 28 into the vee-block 20. The post 34 includes a bottom wear button or contact 40 threaded secured therein. The contact 40 preferably is made from tungsten carbide to provide the desired wearability and precision.

The measurement of the perpendicularity is provided by a dial or measurement indicator 42. The indicator 42 has an indicator face or dial 43 which automatically indicates the deviation from perpendicularity measured by the gage 10. In a die set, the perpendicularity may be required to be 0.001 inches as measured twelve inches from the guide post 12. The gage 10, for convenience, has a measurement position 44 about six inches from the guide post 12 and therefor requires a perpendicularity deviation of 0.0005 inches or less. In this case the indicator 42 measures the perpendicularity deviation in 0.0001 inch graduations.

Figure 4:
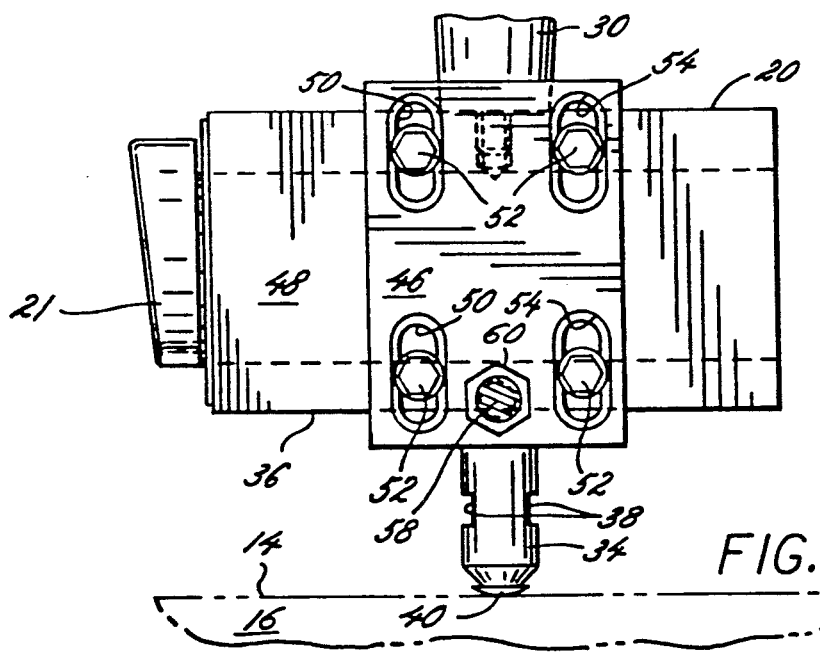
FIG. 4 is a side plan view of the guide post squareness gage measurement indicator bracket.
Figure 5:
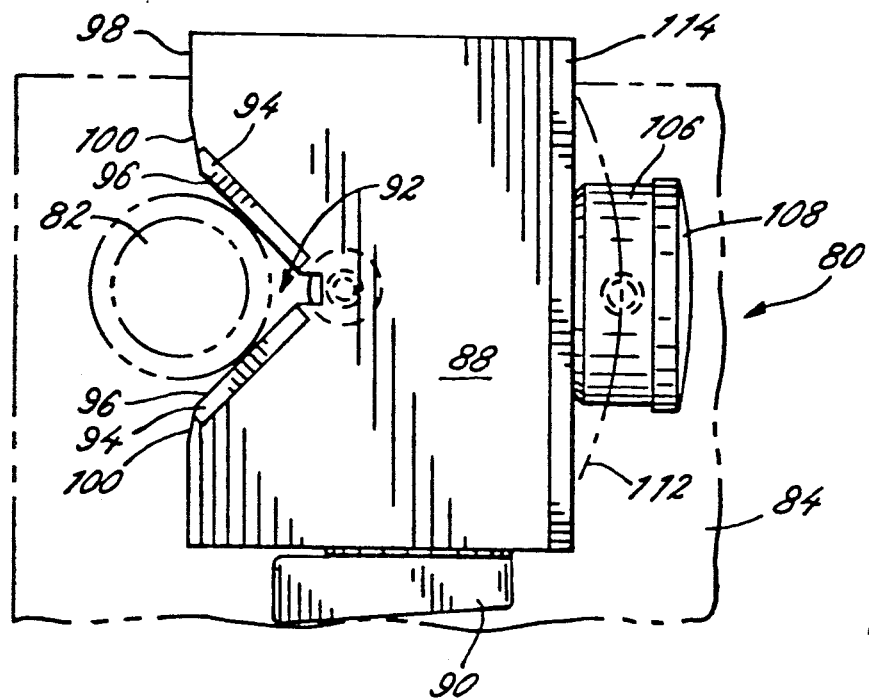
FIG. 5 is a top plan view of a second embodiment of the guide post and/or master cylinder squareness gage of the present invention.

The indicator 42 is mounted to an indicator bracket 46, which indicator bracket 46 is mounted to a side wall 48 of the vee-block 20. Referring to FIG. 4, the indicator bracket 46 and mounting thereof is best illustrated. The indicator bracket 46 includes four slotted mounting holes 50. The holes 50 allow the indicator bracket 46 to be vertically adjusted when mounting the indicator bracket 46 to the vee-block 20. The indicator bracket 46 can be mounted to the vee-block 20 by four socket head screws 52 (one of which is illustrated) threaded into the vee-block 20. The slot hole 50 has an outer wide portion 54 to accommodate the head of the screw 52. The indicator bracket 46 also includes a tapped hole 56 into which the indicator 42 is mounted, as shown in FIG. 3.

The indicator 42 includes a stem 58 which is threaded into the hole 56 and secured by a lock nut 60. The indicator 42 includes an indicator contact post 62, which again preferably has a bottom wear contact or button 64 mounted thereto. The contact 64 also preferably is formed from tungsten carbide. The contact 64 bears against the plane surface 14 at the position 44. The indicator 42 is adjusted when mounted to the vee-block 20 by the bracket 46, such that the indicator 42 will read zero if the guide post 12 is perfectly perpendicular with the plane surface 14.

The measurement position 44 forms an arc 66 (FIG. 3) over which the indicator 42 is moved as the gage 10 is rotated around the guide post 12. The contact post 62 is biased to move up and down as required by the plane surface 14 as the indicator 42 is moved over the arc 66. The movement of the post 62 is reflected by positive or negative readings on the indicator face 43, which measures the perpendicularity of the guide post 12 and indicates which way the guide post 12 tilts and by how much. To obtain a complete reference perpendicularity measurement, the gage 10 preferably is moved around the post 12 in about a 90 degree arc 66, in either direction.

The gage 10 generally is utilized for guide posts 12 having a diameter on the order of about two inches. For utilization with a master cylinder typically having a diameter on the order of six inches, as described with respect to FIG. 7, the vee 22 has an enlarged or compound angle formed therein. The vee 22 has the surfaces 26 inclined at about a forty-five degree angle to a first side 70 of the vee-block 20. To accommodate the larger diameter master cylinder, a second compound angle is formed in the outer end of the vee 22 having surfaces 72 inclined at about a twenty-five degree angle to the first side 70.

Figure 6:
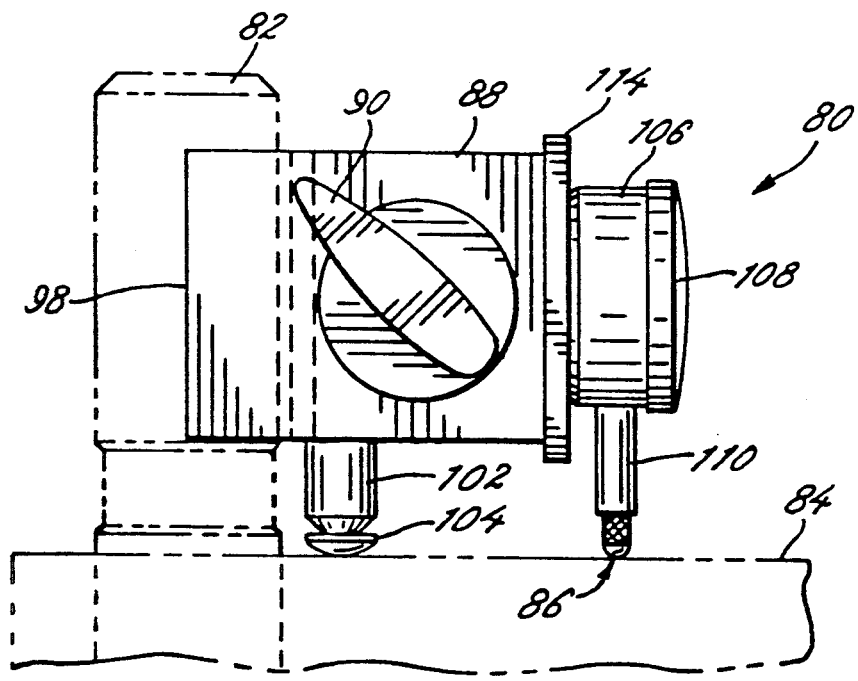
FIG. 6 is a side plan view of the squareness gage of FIG. 5.

As described above, the gage 10 is designed for utilization with large guide post 12 and over large plane surfaces 14. A second embodiment of a guide post and/or master cylinder squareness gage of the present invention is generally indicated by the reference numeral 80, referring to FIGS. 6 and 7. The gage 80 is utilized for a small diameter guide post 82, on the order of one-half inch in diameter. The gage 80 also is utilized to measure planar surfaces 84, where the size of the gage 10 could be too large and the gage 80 has a measurement position 86 which is only about three inches from the guide post 82.

The gage 80 also includes a guide post or master cylinder attachment element or device 88, which can be substantially the same as the device 20, but of a smaller size. Again, the device 88 can have a polarized/depolarized switch 90 to release or engage the gage 80 with the guide post 82 or master cylinder. The vee-block 88 has a vee 92 formed therein, again preferably with a pair of wear strips 94 mounted therein. The strips 94 each have a planar surface 96 formed at an angle of about forty-five degrees to a front surface 98 of the vee-block 88. The vee 92 again has a compound angle formed therein to accommodate larger diameter cylinders, such as a master cylinder. Another pair of surfaces 100 are formed at an angle of about twelve degrees to the surface 98 to accommodate the larger diameter cylinders.

The vee-block 88 includes a stop 102 similar to the stop 28 which bears against the planar surface 84 in a similar manner. The stop 102 preferably includes a wear contact 104, like the contact 40. The measurement of the perpendicularity is provided by a vertical dial or measurement indicator 106 having a face 108, otherwise similar to the indicator 42. The indicator 106 again includes an indicator contact post 110, which bears against the planar surface 84 at the measurement position 86.

The measurement position 86 forms an arc 112 over which the indicator 106 is moved as the gage 80 is rotated around the guide post 82. The indicator 106 is mounted directly to the vee-block 88 by an indicator plate 114 screwed or otherwise secured to both the vee-block 88 and the indicator 106. The operation of the gage 80 is substantially identical to the gage 10.

Figure 7:
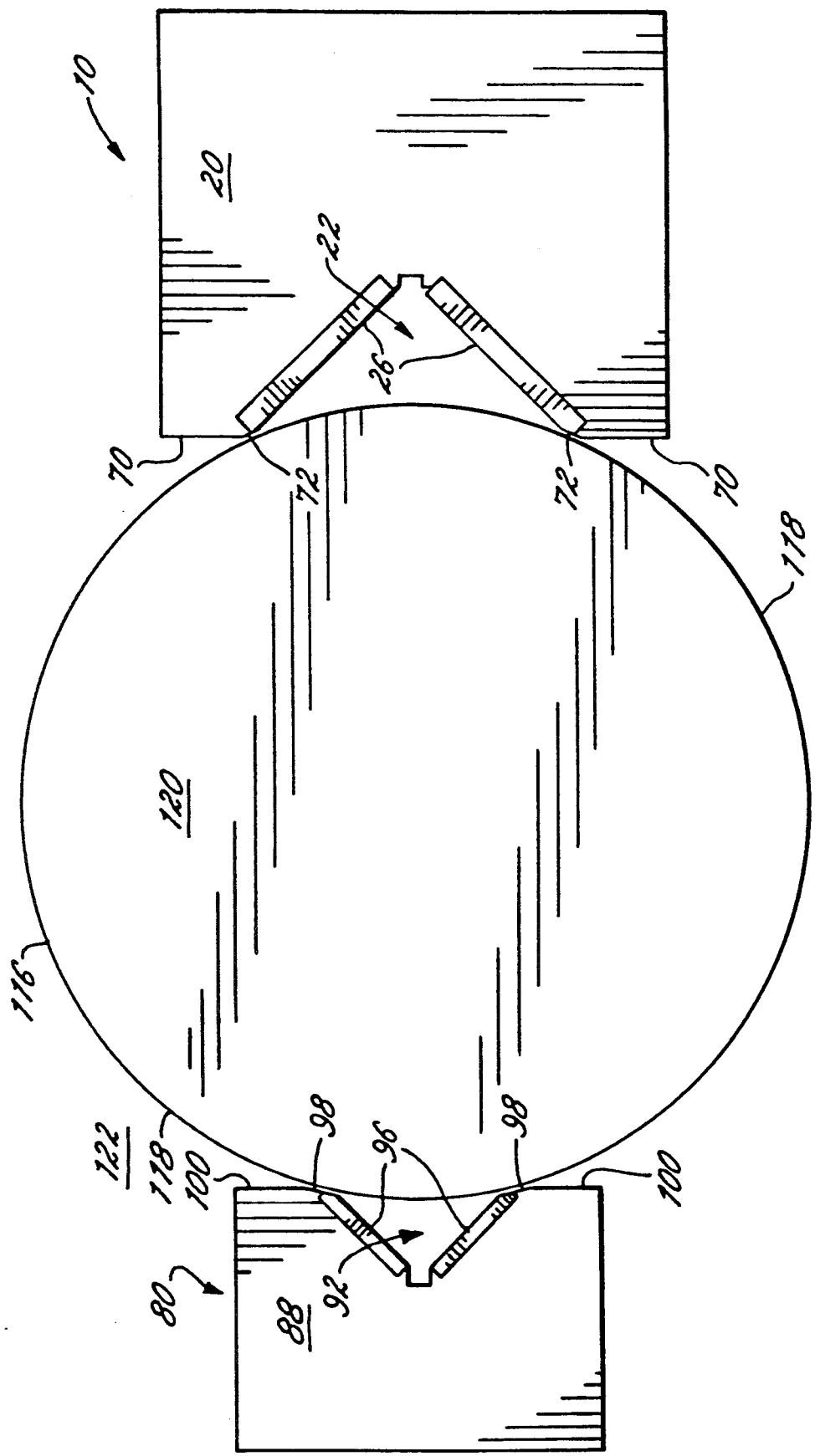
FIG. 7 is a top plan view of the squareness gage utilized with a master cylinder.

Referring now to FIG. 7, a master cylinder 116 is illustrated in a top plan view with both the vee-blocks 20 and 88 engaged therewith for explanation purposes. When the gages 10 or 80 are to be utilized with large diameter posts or cylinders such as the six inch diameter master cylinder 116, the compound angle surfaces 72 or 98 engage the outer surface 118 of the master cylinder 116. The magnetic vee-blocks 20 and 88 in this manner attach readily to the surface 118.

The master cylinder 116 has ends 120 (the top one of which is shown) which are absolutely perpendicular to the side wall or surface 118. The opposite end 120 rests on a planar surface 122 to be measured. The flatness of the planar surface 122 is measured by rotating or turning the master cylinder 116 with the gage 10 or 80 attached thereto. To measure the perpendicularity of the master cylinder 116 itself, the gage 10 or 80 is held fixed and the master cylinder 116 alone is rotated or turned. Thus the gages 10 or 80 can measure the perpendicularity of the planar surface 122 to the master cylinder 116 and the perpendicularity of the master cylinder 116 itself.

Although the gages 10 and 80 have been described as including a polarizing/depolarizing magnetically attaching vee-blocks 20 or 80, other attachment structures also could be utilized. The vee-blocks 20 or 80 could include an electro-magnetic or a permanent magnet which mechanically can be moved adjacent the posts 12 or 82 or the master cylinder 116. Further, a mechanical clamping arm or structure could be utilized to attach the gage 10 to the posts 12 or 82 or the master cylinder 116.

What is claimed and desired to be secured by Letters Patent of the United States is:

1. A guide post or master cylinder squareness gage for measuring the perpendicularity between a cylindrical column and a plane surface, comprising:
   a measurement indicator;
   means for detachably attaching the measurement indicator to the cylindrical column;
   said attaching means having at least two transversely spaced positive contacts disposed along the circumferential surface of the cylindrical column;
   said attaching means further including a fixed stop which bears against the plane surface at a first location adjacent but spaced from said cylindrical column to provide a reference point for said measurement indicator; and
   said measurement indicator including a movable contact biased against said plane surface at a second location spaced from said cylindrical column and said first location such that the movement of the contact relative to the measurement reference point measures the perpendicularity of said cylindrical column.

2. The gage of claim 1 where said cylindrical column is a guide post and the gage includes handle means for moving said movable contact against said plane surface in an arc around said guide post to measure the perpendicularity thereof.

3. The gage of claim 2 including said arc being about ninety degrees.

4. The gage of claim 1 wherein said attaching means includes magnetic attaching means.

5. The gage of claim 4 wherein said magnetic attaching means includes a magnetic vee-block having a vee formed therein which provides a cylindrical column attaching surface for said measurement indicator.

6. The gage of claim 5 including said vee surface having wear surfaces formed thereon.

7. The gage of claim 5 wherein said stop includes a stop post having a wear contact for contacting said plane surface.

8. The gage of claim 5 wherein said measurement indicator is adjustably attached to said vee-block by an indicator bracket.

9. The gage of claim 5 wherein said vee includes a first angle formed therein to attach to a small diameter cylindrical column and a second larger angle formed at the outer ends of said vee to attach to a larger diameter cylindrical column.

10. The gage of claim 9 wherein said small diameter cylindrical column is a guide post and said larger diameter cylindrical column is a master cylinder.

11. The gage of claim 1 wherein said cylindrical column is a guide post, the gage further including handle means for moving said movable contact against said plane surface in an arc around said guide post to measure the perpendicularity thereof, said attaching means further including magnetic attaching means, and said magnetic attaching means including a magnetic vee-block having a vee formed therein which provides said transversely spaced positive contacts for attaching said measurement indicator.

12. The gage of claim 11 including said vee surface having wear surfaces formed thereon.

13. The gage of claim 11 wherein said stop includes a stop post having a wear contact for contacting said plane surface.

14. The gage of claim 11 wherein said measurement indicator is adjustably attached to said vee-block by an indicator bracket.

15. The gage of claim 11 wherein said vee includes a first angle formed therein to attach to said guide post and a second larger angle formed at the outer ends of said vee to attach to a master cylinder.

16. A guide post or master cylinder squareness gage for measuring the perpendicularity between a cylindrical column and a plane surface, comprising:
   a measurement indicator;
   a vee-block comprising means for magnetically attaching the measurement indicator to the cylindrical column, said vee-block providing at least two transversely spaced positive contacts disposed along the circumferential surface of the cylindrical column;
   a fixed stop mounted to said vee-block for bearing against the plane surface at a first location adjacent to but spaced from said cylindrical column to provide a measurement reference point; and
   said measurement indicator including a movable measurement contact biased against said plane surface when mounted to said cylindrical column at a second location spaced from said first location, which movement of the contact relative to the measurement reference point provides a perpendicularity measurement as the measurement indicator is moved in an arc over said plane surface.

17. The gage of claim 16 including said arc being about ninety degrees.

18. The gage of claim 16 wherein said vee-block has a vee for mounting to said guide post and said vee including wear surfaces formed thereon.

19. The gage of claim 18 wherein said vee includes a first angle formed therein to attach to a small diameter cylindrical column and a second larger angle formed at the outer ends of said vee to attach to a larger diameter cylindrical column.

20. The gage of claim 19 wherein said small diameter cylindrical column is a guide post and said larger diameter cylindrical column is a master cylinder.

21. The gage of claim 16 wherein said measurement indicator is adjustably mounted to said vee-block by an indicator bracket.

22. The gage of claim 16 wherein said stop and said contact, each have a wear contact for contacting said plane surface.

23. The gage of claim 16 wherein said vee-block has a vee for mounting to said guide post and said vee including wear surfaces formed thereon; and said measurement indicator is adjustably mounted to said vee-block by an indicator bracket 24. The gage of claim 23 wherein said stop and said contact, each have a wear contact for contacting said plane surface.

* * * * *